United States Patent
Isono et al.

(10) Patent No.: US 10,480,414 B2
(45) Date of Patent: Nov. 19, 2019

(54) COMBUSTOR AND GAS TURBINE WITH PHASE ADJUSTING UNITS IN THE FUEL NOZZLES

(71) Applicant: MITSUBISHI HEAVY INDUSTRIES, LTD., Tokyo (JP)

(72) Inventors: Mitsunori Isono, Tokyo (JP); Toshihiko Saito, Tokyo (JP); Kotaro Miyauchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/777,060

(22) PCT Filed: Feb. 14, 2014

(86) PCT No.: PCT/JP2014/053475
§ 371 (c)(1),
(2) Date: Sep. 15, 2015

(87) PCT Pub. No.: WO2014/148166
PCT Pub. Date: Sep. 25, 2014

(65) Prior Publication Data
US 2016/0032842 A1    Feb. 4, 2016

(30) Foreign Application Priority Data
Mar. 22, 2013    (JP) .................. 2013-059587

(51) Int. Cl.
*F02C 7/22* (2006.01)
*F23R 3/28* (2006.01)
*F23M 20/00* (2014.01)

(52) U.S. Cl.
CPC .......... *F02C 7/222* (2013.01); *F23M 20/005* (2015.01); *F23R 3/286* (2013.01);
(Continued)

(58) Field of Classification Search
CPC .... F02C 9/32; F02C 7/22; F02C 7/222; F05B 2260/96; F23D 2210/00; F23D 11/36;
(Continued)

(56) References Cited

U.S. PATENT DOCUMENTS 5,349,811 A  *  9/1994  Stickler ..................... F02C 9/28
                                                        60/39.281
5,934,555 A  *  8/1999  Dobbeling ............ B05B 1/3442
                                                        239/11
(Continued)

FOREIGN PATENT DOCUMENTS

CN         101278153         10/2008
CN         101949541         1/2011
(Continued)

OTHER PUBLICATIONS

International Search Report dated May 13, 2014 in corresponding International Application No. PCT/JP2014/053475.
(Continued)

*Primary Examiner* — Gerald L Sung
*Assistant Examiner* — Stephanie Cheng
(74) *Attorney, Agent, or Firm* — Wenderoth, Lind & Ponack, L.L.P.

(57) ABSTRACT

A combustor includes fuel nozzles that extend in an axial direction of a combustor main body and are capable of injecting fuel from injection holes on a combustion chamber side. The combustor includes a phase adjusting unit which partially changes a flow path cross-sectional area of at least one of the fuel nozzles in the axial direction such that phases of flow rate fluctuation of fuel do not match with respect to at least two of the fuel nozzles.

18 Claims, 5 Drawing Sheets

(52) U.S. Cl.
CPC .... *F05D 2260/96* (2013.01); *F05D 2260/963* (2013.01); *F05D 2270/333* (2013.01); *F23D 2210/00* (2013.01); *F23R 2900/00014* (2013.01)

(58) Field of Classification Search
CPC ......... F23D 2900/14482; F23M 20/005; F23R 2900/00014; F05D 2270/333
USPC .......................................................... 60/725
See application file for complete search history.

(56) References Cited

U.S. PATENT DOCUMENTS

| | | | | |
|---|---|---|---|---|
| 6,068,467 | A * | 5/2000 | Mandai | F23D 14/02 431/174 |
| 6,269,646 | B1 * | 8/2001 | Lovett | F23R 3/286 431/114 |
| 6,490,864 | B1 | 12/2002 | Joos et al. | |
| 6,631,614 | B2 * | 10/2003 | Mandai | F23D 17/002 60/737 |
| 6,880,340 | B2 * | 4/2005 | Saitoh | F23D 14/70 60/737 |
| 7,694,521 | B2 * | 4/2010 | Ohta | F23R 3/343 60/740 |
| 7,827,797 | B2 | 11/2010 | Han et al. | |
| 8,015,791 | B2 * | 9/2011 | Finkbeiner | F02C 7/22 60/39.281 |
| 8,261,529 | B2 * | 9/2012 | Koizumi | F02C 3/22 60/39.463 |
| 8,322,140 | B2 * | 12/2012 | Kim | F02C 7/22 60/725 |
| 9,334,808 | B2 * | 5/2016 | Abe | F02C 6/18 |
| 2002/0011070 | A1 | 1/2002 | Mandai et al. | |
| 2008/0053097 | A1 | 3/2008 | Han et al. | |
| 2009/0077945 | A1 * | 3/2009 | Cornwell | F02C 7/232 60/39.281 |
| 2010/0089065 | A1 * | 4/2010 | Tuthill | F23D 11/106 60/737 |
| 2010/0297566 | A1 * | 11/2010 | Noiray | F23D 14/46 431/159 |
| 2011/0162370 | A1 | 7/2011 | Kim et al. | |
| 2012/0031103 | A1 * | 2/2012 | Abe | F02C 6/18 60/776 |
| 2014/0137558 | A1 * | 5/2014 | Toronto | F02C 7/222 60/739 |
| 2015/0285141 | A1 * | 10/2015 | Manabe | F23R 3/346 60/774 |
| 2016/0326905 | A1 * | 11/2016 | Zhang | F16L 55/0335 |

FOREIGN PATENT DOCUMENTS

| | | |
|---|---|---|
| CN | 102116478 | 7/2011 |
| JP | 2002-522741 | 7/2002 |
| JP | 3494753 | 2/2004 |
| JP | 2004-85120 | 3/2004 |
| JP | 2004-150793 | 5/2004 |
| JP | 2008-64449 | 3/2008 |
| JP | 2011-117650 | 6/2011 |
| JP | 2011-137629 | 7/2011 |
| WO | 2012/025427 | 3/2012 |

OTHER PUBLICATIONS

Written Opinion of the International Searching Authority dated May 13, 2014 in corresponding International Application No. PCT/JP2014/053475.

Notice of Preliminary Rejection dated Jun. 10, 2016 in corresponding Korean Application No. 10-2015-7025378 (with English translation).

First Office Action dated Jun. 14, 2016 in corresponding Chinese Application No. 201480013694.0 (with English translation).

\* cited by examiner

COMBUSTOR AND GAS TURBINE WITH PHASE ADJUSTING UNITS IN THE FUEL NOZZLES

CROSS-REFERENCE TO RELATED APPLICATION

Priority is claimed from Japanese Patent Application No. 2013-59587, filed Mar. 22, 2013, the content of which is incorporated herein by reference.

TECHNICAL FIELD

The present invention relates to a combustor and a gas turbine which is provided with the combustor.

BACKGROUND ART

A general gas turbine is provided with a compressor which produces compressed air, a combustor which produces combustion gas by using the compressed air produced in the compressor, and a turbine which is rotationally driven by the combustion gas produced in the combustor.

The combustor of the gas turbine mixes the compressed air compressed in the compressor with fuel and burns the mixture. However, at this time, there is a case where large combustion oscillation occurs. One of the causes of the combustion oscillation is that pressure fluctuation in a combustion chamber causes variation in a fuel flow rate in a main nozzle which injects fuel. If the fuel flow rate in the main nozzle varies, heat generation fluctuation when burning the fuel occurs according to the flow rate fluctuation. The heat generation fluctuation further causes pressure fluctuation in the combustor.

Japanese Unexamined Patent Application, First Publication No. 2011-137629 discloses a technique in which in order to realize an acoustic characteristic in which it is hard for a fuel flow rate in a main nozzle to respond to pressure fluctuation in a combustion chamber, an orifice for reducing a flow path cross-sectional area is provided in a fuel pipe on the upstream side of a manifold from which a main nozzle branches and is connected thereto.

Technical Problem

Incidentally, in the combustor described above, flow rate fluctuation is limited by increasing acoustic impedance of the fuel pipe on the upstream side before the main nozzle branches therefrom. However, in a case where a plurality of main nozzles have the same acoustic characteristic, flow rate fluctuation occurs in the same phase in the respective main nozzles. If the fuel subjected to the flow rate fluctuation in the same phase is injected from the respective main nozzles, the amplitudes of fuel/air ratio fluctuation in swirlers disposed around the main nozzles are summed in the combustion chamber. For this reason, the amplitude of fuel/air ratio fluctuation in the combustion chamber increases, whereby large heat generation fluctuation and pressure fluctuation occur in the combustion chamber, and thus there is a problem in that it is not possible to sufficiently reduce combustion oscillation.

Here, in order to shift the phase of flow rate fluctuation occurring in the main nozzle, it is conceivable to change an acoustic characteristic by changing the inner diameter of each main nozzle, for example. However, in this case, although the phase of fuel fluctuation is shifted, pressure loss in each main nozzle becomes non-uniform. For this reason, a bias occurs in a fuel flow rate which is supplied from each main nozzle. In this way, the destabilization of combustion in a combustion area is induced or a hot spot is formed in a flame, whereby the amount of NOx (nitrogen oxide) increases.

SUMMARY OF INVENTION

The present invention provides a combustor and a gas turbine in which it is possible to sufficiently reduce combustion oscillation by suppressing flow rate fluctuation of fuel which is supplied to a combustion area.

Technical Solution

According to a first aspect of the present invention, there is provided a combustor provided with a plurality of fuel nozzles which extend in an axial direction of a combustor main body and capable of injecting fuel from injection holes which are disposed on the combustion chamber side. The combustor includes a phase adjusting unit which partially changes a flow path cross-sectional area of at least one fuel nozzle in the axial direction such that phases of flow rate fluctuation of the fuel do not match with respect to at least two fuel nozzles among the plurality of fuel nozzles.

According to a second aspect of the present invention, there is provided the combustor in which each of the plurality of fuel nozzles in the combustor according to the first aspect may be provided with the phase adjusting unit and the phase adjusting units of the fuel nozzles adjacent to each other may be disposed to be shifted away from each other in the axial direction.

According to a third aspect of the present invention, there is provided the combustor in which the plurality of fuel nozzles in the combustor according to the first aspect may be disposed in a row and the phase adjusting units may be provided every other fuel nozzle in an array direction in the plurality of fuel nozzles.

According to a fourth aspect of the present invention, there is provided the combustor in which in the combustor according to any one of the first to third aspects, the fuel nozzle which is provided with the phase adjusting unit may have an injection hole having a size corresponding to the magnitude of pressure loss occurring due to the phase adjusting unit.

According to a fifth aspect of the present invention, there is provided a combustor in which the phase adjusting units in the combustor according to any one of the first to fourth aspects may make the phases of flow rate fluctuation of the fuel in the fuel nozzles adjacent to each other have opposite phases.

According to a sixth aspect of the present invention, there is provided the combustor in which the phase adjusting unit in the combustor according to any one of the first to fifth aspects may be provided with a cavity portion which increases the flow path cross-sectional area.

According to a seventh aspect of the present invention, there is provided the combustor in which the phase adjusting unit in the combustor according to any one of the first to sixth aspects may be an orifice portion which reduces the flow path cross-sectional area.

According to an eighth aspect of the present invention, there is provided the combustor in which the phase adjusting unit in the combustor according to any one of the first to seventh aspects may be a porous material which is disposed in a flow path of the fuel nozzle.

According to a ninth aspect of the present invention, there is provided the combustor in which the plurality of fuel nozzles in the combustor according to any one of the first to eighth aspects may branch from and be connected to a manifold.

According to a tenth aspect of the present invention, there is provided a gas turbine including the combustor according to any one of the first to ninth aspects.

Advantageous Effects of Invention

According to the combustor described above, it is possible to sufficiently reduce combustion oscillation by suppressing flow rate fluctuation of fuel which is supplied to a combustion area.

According to the gas turbine described above, it is possible to reduce combustion oscillation in the combustor, and therefore, it is possible to prevent damage to components due to the combustion oscillation.

DESCRIPTION OF EMBODIMENTS

Next, a gas turbine and a combustor in a first embodiment of the present invention will be described based on the drawings.

Figure 1:
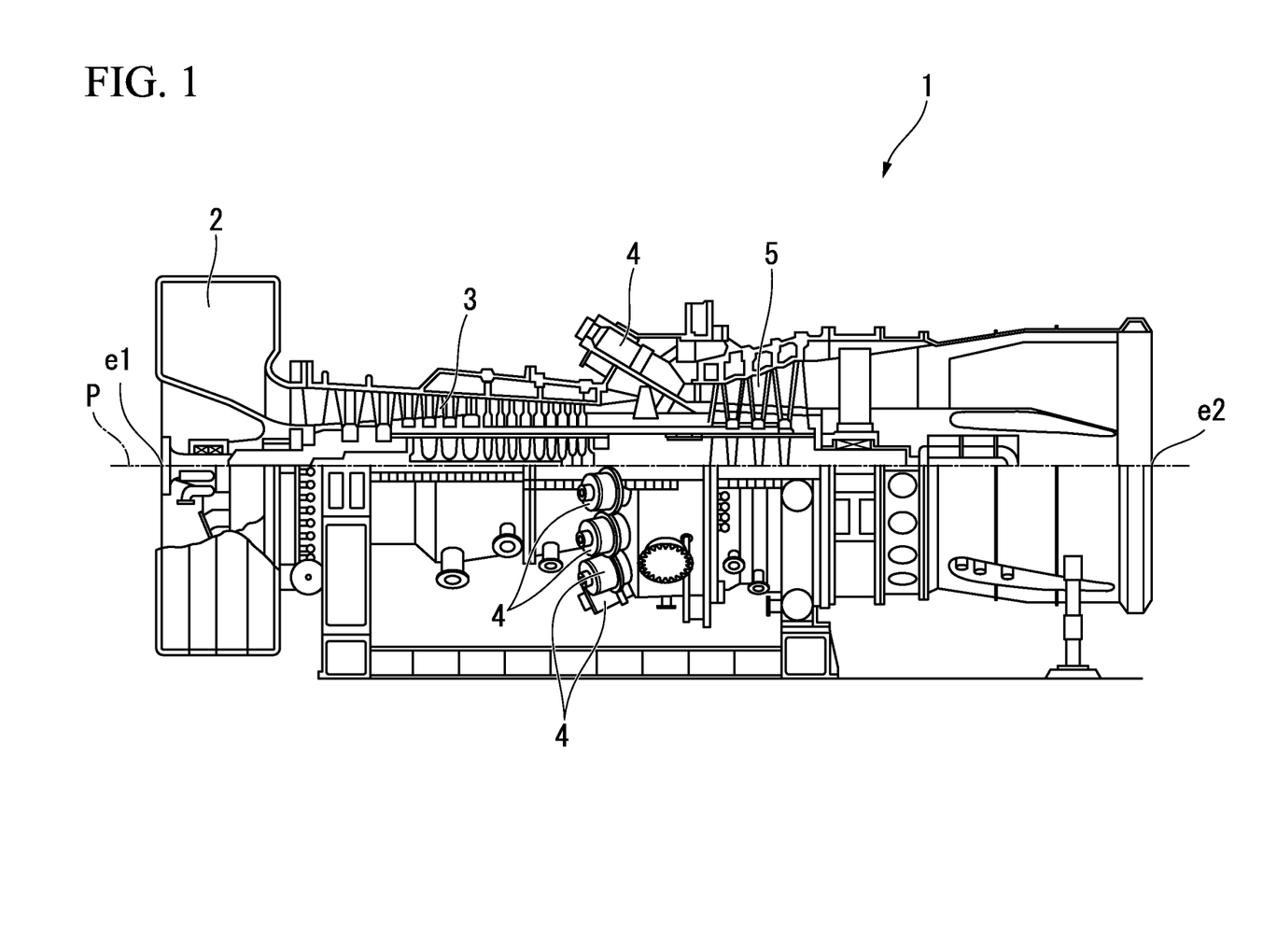
FIG. 1 is a partial sectional view of a gas turbine in a first embodiment of the present invention.

FIG. 1 is a partial sectional view showing the gas turbine of this embodiment.

As shown in FIG. 1, a gas turbine 1 in this embodiment is provided with an air intake 2, a compressor 3, a combustor 4, and a turbine 5 toward a second end portion e2 from a first end portion e1 in an axial direction (a direction parallel to an axis line P).

In the gas turbine 1, first, air taken in from the air intake 2 is compressed by the compressor 3. Subsequently, in the gas turbine 1, compressed air compressed by the compressor 3 is mixed with fuel and the mixture is burned by the combustor 4, thereby producing high-temperature and high-pressure combustion gas. Thereafter, in the gas turbine 1, the high-temperature and high-pressure combustion gas is supplied to the turbine 5, thereby rotating the turbine 5. The rotating force of the turbine 5 is converted to electric power by, for example, an electric generator or the like.

Figure 2:
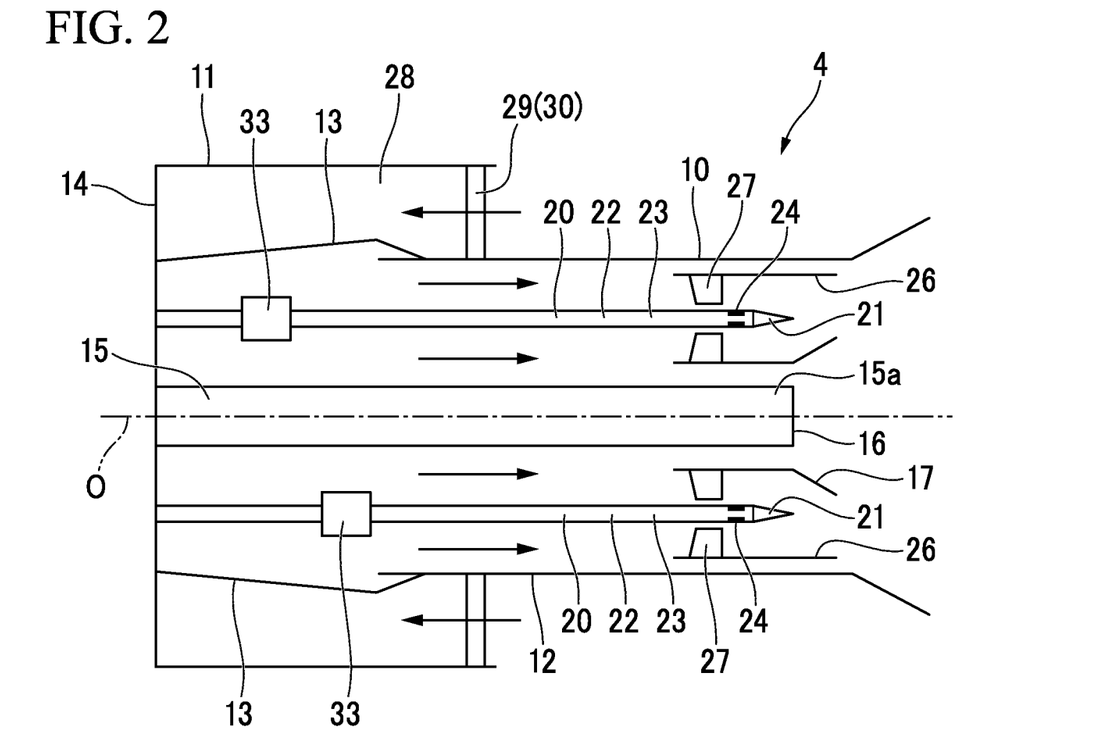
FIG. 2 is a sectional view showing the configuration of a combustor of the gas turbine.

As shown in FIG. 2, the combustor 4 is provided with a combustor basket 10 and a combustor casing 11. Each of the combustor basket 10 and the combustor casing 11 is formed in a hollow shape. The combustor casing 11 is disposed so as to cover the combustor basket 10. The central axes of the combustor basket 10 and the combustor casing 11 are disposed on an axis line O of the combustor 4. The combustor casing 11 is disposed on the outside in a radial direction on the base portion side (the left side of the plane of the drawing) of the combustor basket 10 in a direction of the axis line O.

The combustor basket 10 has a combustor basket support 13 provided on the base portion side of a combustor basket main body portion 12. The combustor basket support 13 is disposed between the combustor basket main body portion 12 and a rear wall 14 of the combustor casing 11. The combustor basket main body portion 12 is supported on the rear wall 14 through the combustor basket support 13.

The combustor 4 is further provided with a pilot nozzle 15 extending in the direction of the axis line O on the axis line O. The pilot nozzle 15 performs diffusion combustion by injecting pilot fuel in order to enhance flame stability. A pilot injection port 16 for injecting fuel mixed with the compressed air is formed in a tip portion 15a of the pilot nozzle 15. The tip portion 15a of the pilot nozzle 15 is covered with a pilot cone 17 with a distance therebetween, from the outside. The pilot cone 17 has a tubular shape having a constant thickness in the direction of the axis line O, at a portion facing the outer peripheral surface of the pilot nozzle 15. Further, the pilot cone 17 expands in diameter with increasing distance from the pilot injection port 16 in the direction of the axis line O.

The combustor 4 further has a plurality of (for example, eight) main nozzles 20 provided around the pilot nozzle 15. The plurality of main nozzles 20 are formed to extend parallel to the direction of the axis line O. The lengths in the direction of the axis line O of the respective main nozzles 20 have the same length L1 (refer to FIG. 3). The main nozzles 20 are arranged in the form of a ring centered on the axis line O to be spaced apart from each other in a circumferential direction so as to surround the pilot nozzle 15. A tip portion 21 of each main nozzle 20 has a tapered shape gradually reducing in diameter of the main nozzles 20. A plurality of main injection holes 24 for injecting fuel are formed in a peripheral wall 23 of a nozzle main body portion 22 in the vicinity of the tip portion 21. The inner diameter, that is, the flow path cross-sectional area of the nozzle main body portion 22 of each main nozzle 20 has a constant flow path cross-sectional area other than in a portion where a phase adjusting unit 33 (described later) is disposed. The main nozzle 20 performs premixed combustion by injecting the fuel from the main injection holes 24. Here, the number of main nozzles 20 may be an even number.

The combustor 4 is further provided with a main burner 26. The main burner 26 is disposed on the tip portion 21 side of the main nozzle 20. The main burner 26 is formed so as to cover the tip portion 21 from the outside with a distance therebetween in the radial direction. A main swirler 27 for mixing the compressed air which is supplied from the compressor 3 with the main fuel which is injected from the main nozzle 20 is disposed between the main burner 26 and the main nozzle 20. In FIG. 2, a pilot swirler for mixing the pilot fuel with the compressed air, which is disposed around the pilot nozzle 15, is omitted.

The combustor 4 is provided with an air flow path 28 through which the compressed air supplied from the compressor 3 flows, between the combustor basket 10 and the combustor casing 11. The air flow path 28 is connected to an inlet 30 on which a flow straightening plate 29 made of perforated metal or the like is mounted, on the side opposite to the rear wall 14 of the combustor casing 11 in the direction of the axis line O. Here, the combustor basket support 13 described above extends toward the rear wall 14 of the combustor casing 11 from between the main nozzles 20 adjacent to each other in the circumferential direction, for example. The compressed air having flowed into the air flow path 28 flows in toward the inside in the radial direction, in other words, the axis line side from between the combustor basket supports 13. Then, a direction of a flow of the compressed air is changed by 180 degree in the direction parallel to the axis line O with respect to the compressed air which flows into the air flow path 28. Moreover, the compressed air uniformly flows toward the sides of the respective tip portions 21 and 15a along the main nozzle 20 and the pilot nozzle 15.

Figure 3:
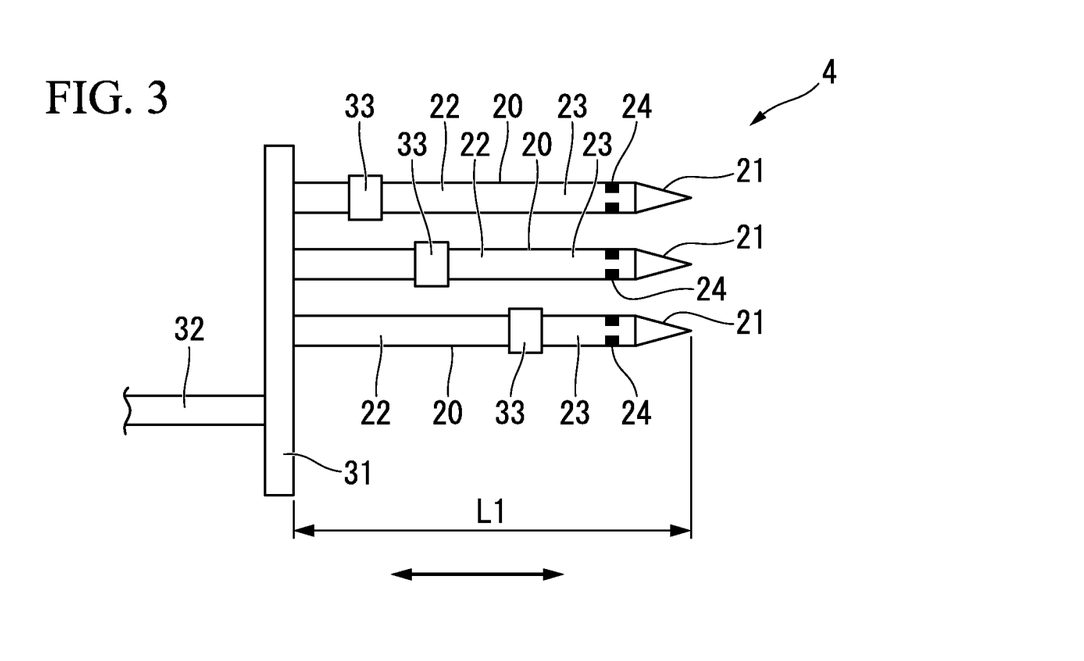
FIG. 3 is a schematic configuration diagram of a main nozzle, a manifold which supplies main fuel to the main nozzle, and a fuel pipe of the combustor.

FIG. 3 shows schematic configurations of the main nozzles 20, a manifold 31 which supplies the main fuel to the main nozzles 20, and a fuel pipe 32 of the combustor 4 described above.

As shown in FIG. 3, the combustor 4 is provided with the manifold 31 from which the main nozzles 20 branch and are connected thereto. The main fuel is supplied to the manifold 31 through the fuel pipe 32. The manifold 31 evenly distributes the main fuel supplied from the fuel pipe 32, to the plurality of main nozzles 20. Here, the main fuel flowing through the inside of the main nozzle 20 undergoes pressure fluctuation in a combustion chamber (not shown) of the combustor 4, whereby the flow rate thereof varies periodically. For this reason, the amount of fuel injected from each main nozzle 20 also varies periodically.

Each of the main nozzles 20 is provided with the phase adjusting unit 33. The phase adjusting units 33 are provided in order to shift the acoustic characteristics of the respective main nozzles 20 such that the phase of flow rate fluctuation of the main fuel (hereinafter referred to simply as a phase of flow rate fluctuation) occurring in each main nozzle 20 does not match with respect to the main nozzles 20 adjacent to each other. The phase adjusting unit 33 in this embodiment is composed of a cavity portion which partially increases the flow path cross-sectional area of the main nozzle 20 in the direction parallel to the axis line O (the direction by an arrow in FIG. 3).

Here, in the main nozzle 20, if the flow path cross-sectional area thereof is partially increased by the phase adjusting unit 33 in the direction of the axis line O, the acoustic characteristic thereof changes with respect to a main nozzle 20 in which the flow path cross-sectional area is not increased. In other words, by providing the phase adjusting unit 33, it is possible to shift the phase of flow rate fluctuation. For example, in a case where the shapes of the phase adjusting units 33 each composed of the cavity portion are the same, the acoustic characteristic of the main nozzle 20 is changed based on the disposition of the phase adjusting unit 33 in the direction of the axis line O, whereby the phase of flow rate fluctuation changes.

Each main nozzle 20 in this embodiment is made such that the position of the phase adjusting unit 33 in the direction of the axis line O does not coincide with the position of the phase adjusting unit 33 of the main nozzle 20 which is disposed next to the phase adjusting unit 33. More specifically, the phase adjusting units 33 which are provided in the main nozzles 20 adjacent to each other are necessarily disposed to be shifted away from each other in the direction parallel to the axis line O.

Figure 4:
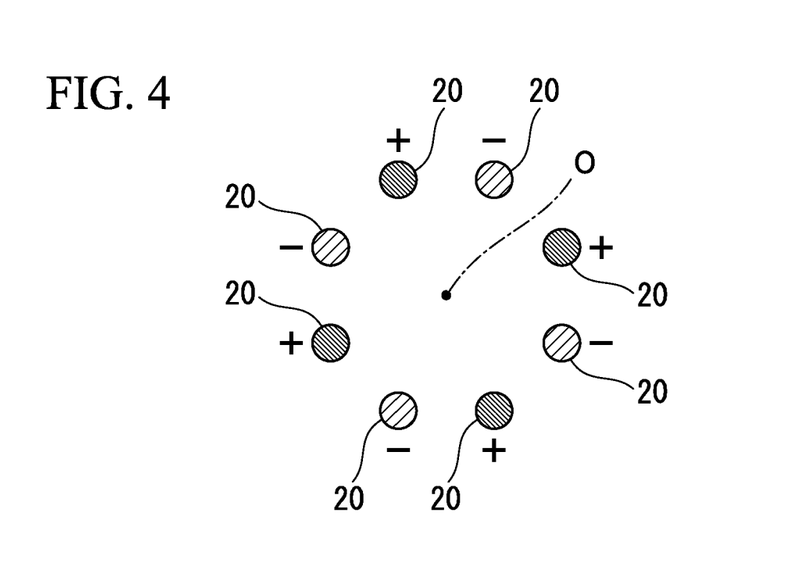
FIG. 4 is a schematic diagram showing the relationship between flow rate fluctuations in the main nozzles.

Each of the phase adjusting units 33 is disposed such that the phases of flow rate fluctuation in the main nozzles 20 adjacent to each other have opposite phases. That is, as shown in FIG. 4, in the flow rate fluctuation in the main nozzles 20, a peak (shown by "+" in FIG. 4) and a bottom (shown by "−" in FIG. 4) alternately appear in an array direction. In addition, the disposition relationship of the phase adjusting units 33 that the phases to reverse is changed based on various conditions such as the pipe diameter or the thickness of the main nozzle 20. For this reason, by determining the acoustic characteristics of the main nozzle 20 in various conditions by simulation or the like, it is possible to determine the disposition relationship making opposite phases.

Therefore, according to the combustor 4 of the first embodiment described above, it is possible to shift the phase of flow rate fluctuation in the main nozzle 20 by the phase adjusting unit 33, and therefore, it is possible to prevent matching of the phases of flow rate fluctuation with respect to the main nozzles 20. As a result, the amplitude of fluctuation of a fuel/air ratio in the combustion chamber in which the flow rate fluctuations in the plurality of main nozzles 20 are summed is reduced, and thus it becomes possible to sufficiently reduce combustion oscillation.

Further, the phase adjusting unit 33 is provided in each main nozzle 20, whereby it is possible to limit variation in pressure loss occurring in each main nozzle 20. Further, the phase adjusting unit 33 is partially formed in the direction of the axis line O, whereby it is possible to minimize the influence on an air flow path which is formed around the main nozzle 20.

Further, it is possible to change the acoustic characteristic of each main nozzle 20 according to the disposition in the direction of the axis line O of the phase adjusting unit 33, and therefore, it is possible to easily adjust the phase of flow rate fluctuation occurring in each main nozzle 20.

Further, the phases of flow rate fluctuation occurring in the main nozzles 20 adjacent to each other are made to become opposite phases with respect to each other, whereby the flow rate fluctuations in the main nozzles 20 adjacent to each other act so as to cancel the flow rate fluctuations of each other. For this reason, the amplitude of fluctuation of the fuel/air ratio in the combustion chamber is limited, and thus it is possible to further reduce the combustion oscillation.

In particular, in a case where the plurality of main nozzles 20 branch from and are connected to the manifold 31, it is possible to prevent flow rate fluctuation which occurs in each main nozzle 20 further toward the combustion chamber side than the manifold 31 according to pressure fluctuation in the combustion chamber from affecting combustion in the combustion chamber.

Further, according to the gas turbine 1 which is provided with the combustor 4, fluctuation of fuel which is supplied to the combustion chamber is reduced, and thus it is possible to limit the combustion oscillation of the combustor 4. For this reason, it is possible to limit component damage or the like due to the combustion oscillation.

Next, the combustor 4 in a second embodiment of the present invention will be described based on FIG. 5. In the combustor 4 of the second embodiment, the phase adjusting unit 33 of the combustor 4 of the first embodiment described above is configured as an orifice portion instead of the cavity portion. For this reason, in the second embodiment, description will be provided with the same portions as those in the first embodiment described above denoted by the same reference numerals.

Figure 5:
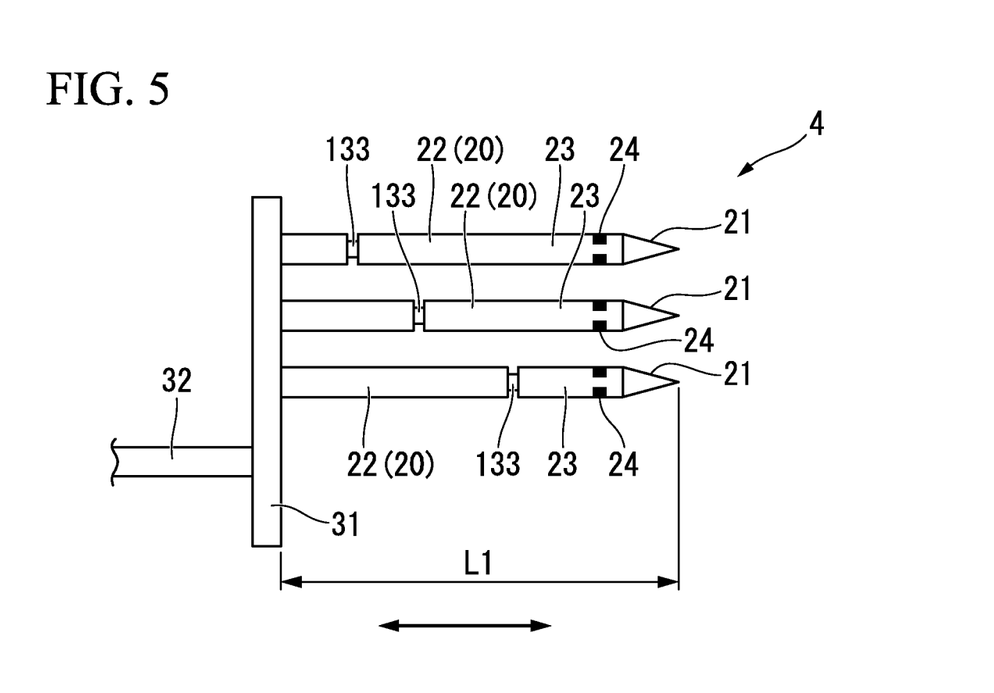
FIG. 5 is a schematic configuration diagram equivalent to FIG. 3 in a second embodiment of the present invention.

As shown in FIG. 5, the combustor 4 in this embodiment is provided with the plurality of main nozzles 20, similarly to the combustor 4 of the first embodiment described above. The plurality of main nozzles 20 are formed to extend parallel to the direction of the axis line O. The lengths in the direction of the axis line O of the plurality of main nozzles 20 have the same length L1. The main nozzles 20 are arranged in the form of a ring centered on the axis line O to be spaced apart from each other in the circumferential direction. Each of the main nozzles 20 has the tapered tip portion 21 which gradually reduces in diameter of the main nozzle. The plurality of main injection holes 24 for injecting fuel are formed in the peripheral wall of the nozzle main body portion 22 in the vicinity of the tip portion 21. The flow path cross-sectional area of the nozzle main body portion 22 has a constant flow path cross-sectional area other than in a phase adjusting unit 133. The main nozzle 20 is provided with the phase adjusting unit 133 which partially changes the flow path cross-sectional area in the direction of the axis line O.

The phase adjusting unit 133 in this embodiment is composed of an orifice portion which partially reduces the flow path cross-sectional area in the direction of the axis line O. By providing the phase adjusting unit 133 composed of the orifice portion, it is possible to shift the phase of flow rate fluctuation by changing the acoustic characteristic with respect to a main nozzle 20 in which the phase adjusting unit 133 is not provided, similarly to the case of the phase adjusting unit 33 of the first embodiment described above. In a case where the shapes of the phase adjusting units 133 each composed of the orifice portion are the same, the acoustic characteristic of the main nozzle 20 changes according to the disposition in the direction of the axis line O of the phase adjusting unit 133. For this reason, by changing the disposition in the direction of the axis line O of the phase adjusting unit 133, it is possible to change the phase of flow rate fluctuation.

The phase adjusting units 133 which are provided in the respective main nozzles 20 in this embodiment are disposed such that the positions thereof in the direction of the axis line O do not coincide with each other between the main nozzles 20 adjacent to each other, similarly to the phase adjusting unit 33 of the first embodiment. More specifically, the phase adjusting units 133 are disposed such that the phases of flow rate fluctuation in the main nozzles 20 adjacent to each other become opposite phases with respect to each other.

Each main nozzle 20 has the main injection hole 24 having a size corresponding to the magnitude of pressure loss which increases due to the phase adjusting unit 133. That is, the main injection hole 24 is formed to be larger by a size corresponding to pressure loss which increases due to the phase adjusting unit 133 composed of the orifice portion. In this way, the pressure loss in the entirety of the main nozzle 20 becomes equal to the pressure loss in the entirety of the main nozzle 20 in a case where the phase adjusting unit 133 is not provided.

Therefore, according to the combustor 4 of the second embodiment described above, the flow path cross-sectional area is partially reduced in the direction of the axis line O, and therefore, it is possible to shift the phase of the flow rate fluctuation of fuel occurring in a fuel nozzle while minimizing an increase in pressure loss occurring in each main nozzle 20. As a result, it becomes possible to sufficiently reduce combustion oscillation associated with flow rate fluctuation in the main nozzle 20.

Further, it is possible to shift the phase of the flow rate fluctuation of fuel occurring in the main nozzle 20 without causing the phase adjusting unit 133 to protrude further toward the outside than the peripheral wall 23 of the main nozzle 20. For this reason, it is possible to improve, for example, the degree of freedom in the disposition of a component or the like around the main nozzle 20.

Further, pressure loss which increases due to the phase adjusting unit 133 is compensated for by adjusting the size of the main injection hole 24. For this reason, it is not necessary to increase the pressure used to supply the main fuel, and it is possible to easily reduce the combustion oscillation.

Figure 6:
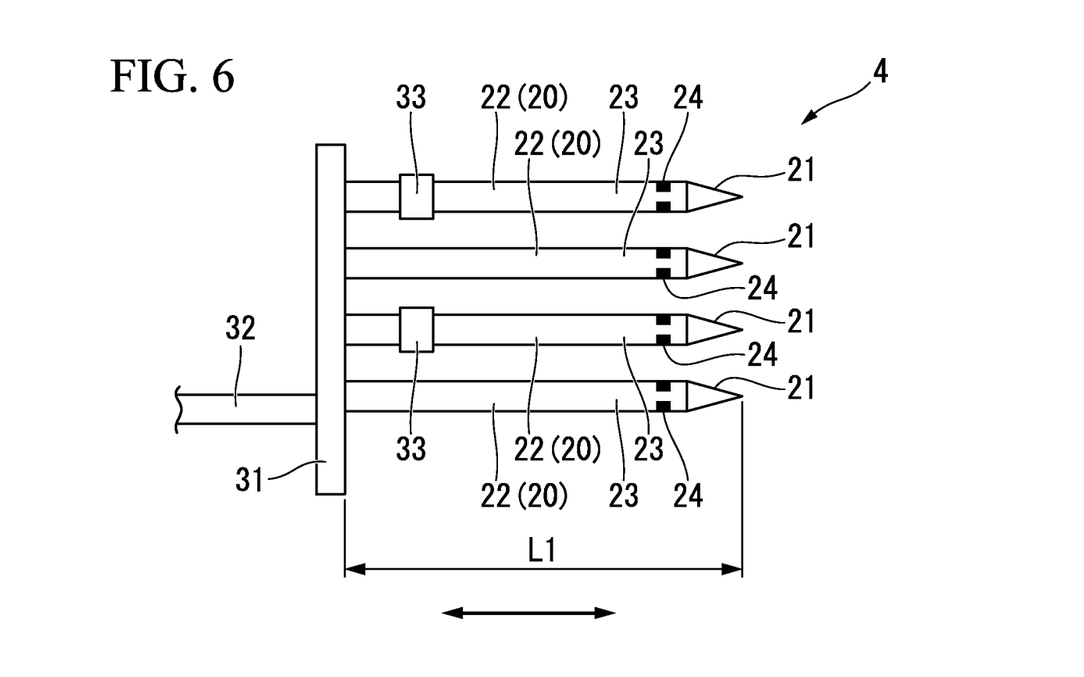
FIG. 6 is a schematic configuration diagram equivalent to FIG. 3 in a third embodiment of the present invention.

Next, the combustor 4 in a third embodiment of the present invention will be described based on a drawing. The combustor 4 of the third embodiment is different from the combustor 4 of the first embodiment described above only in that the phase adjusting units 33 are provided every other main nozzle in an array direction in the plurality of main nozzles 20 disposed in a row. For this reason, a description will be provided with the same portions denoted by the same reference numerals.

As shown in FIG. 6, the combustor 4 in this embodiment is provided with the plurality of main nozzles 20, similarly to the combustor 4 of the first embodiment described above. The plurality of main nozzles 20 are formed to extend parallel to the direction of the axis line O (shown by an arrow in FIG. 6). The lengths in the direction of the axis line O of the plurality of main nozzles 20 have the same length L1. The main nozzles 20 are arranged in the form of a ring centered on the axis line O to be spaced apart from each other in the circumferential direction. Each of the main nozzles 20 is provided with the tapered tip portion 21 which gradually reduces in diameter. The plurality of main injection holes 24 for injecting the main fuel are formed in the peripheral wall 23 of the nozzle main body portion 22 in the vicinity of the tip portion 21. The flow path cross-sectional area of each nozzle main body portion 22 has a constant flow path cross-sectional area other than in a place where the phase adjusting unit 33 is disposed.

In the plurality of main nozzles 20 disposed in a row in the form of a ring, the phase adjusting units 33 are provided every other main nozzle in the array direction. The phase adjusting unit 33 in this embodiment is composed of a cavity portion which partially expands the flow path cross-sectional area of the main nozzle 20 in the direction of the axis line O. Here, the phase of flow rate fluctuation in the main nozzle 20 which is provided with the phase adjusting unit 33 is shifted from the phase of flow rate fluctuation in the main nozzle 20 which is not provided with the phase adjusting unit 33. The phase adjusting unit 33 is disposed at a predetermined position in the direction of the axis line O where the phases of flow rate fluctuation in the main nozzles 20 adjacent to each other have opposite phases. The respective phase adjusting units 33 provided in the plurality of main nozzles 20 are disposed at the same positions in the direction of the axis line O.

The main nozzle 20 having the phase adjusting unit 33 has the main injection hole 24 having a size corresponding to the magnitude of pressure loss which changes due to provision of the phase adjusting unit 33. That is, the size of the main injection hole 24 is adjusted such that pressure loss in the entirety of the main nozzle 20 having the phase adjusting unit 33 becomes equal to pressure loss in the entirety of the main nozzle 20 which does not have the phase adjusting unit 33.

Therefore, according to the combustor 4 of the third embodiment described above, similarly to the combustor 4 of the first embodiment, it is possible to reduce the combustion oscillation. In addition, the phase adjusting units 33 can be disposed at the same positions in the direction of the axis line O, and therefore, it is enough if two types of main nozzle 20 having only a difference in the presence or absence of the phase adjusting unit 33 are prepared. Since it is enough if the two types of main nozzle 20 are alternately disposed, it is possible to prevent assembly work from becoming complicated. As a result, it is possible to reduce the burden on an assembling assembly work.

Figure 7:
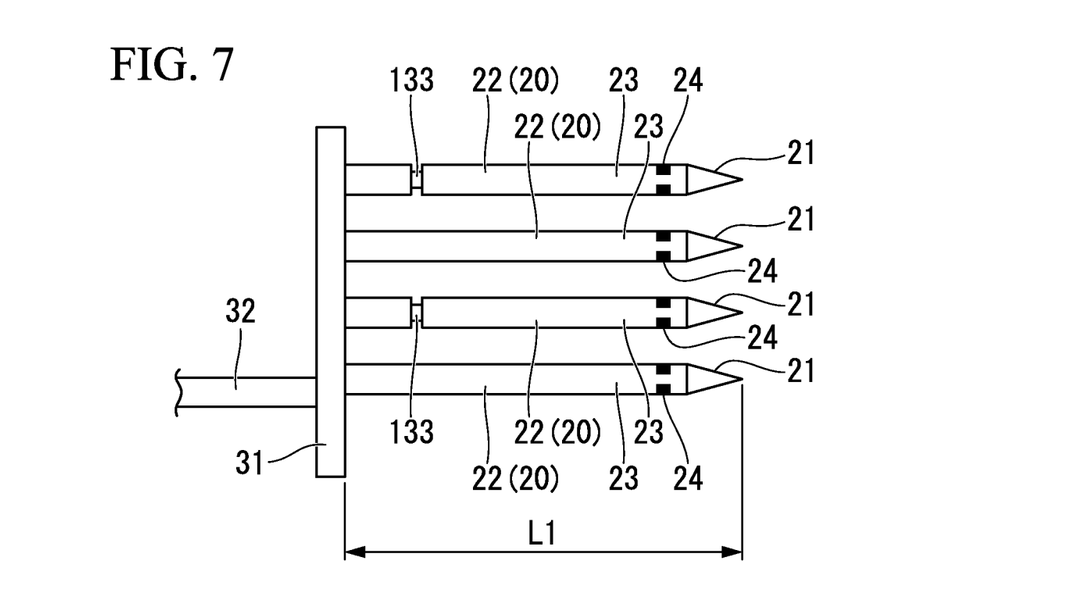
FIG. 7 is a schematic configuration diagram equivalent to FIG. 3 in a modified example of the third embodiment.

In the third embodiment described above, a case of having the phase adjusting unit 33 composed of the cavity portion has been described. However, for example, as a modified example of the third embodiment, as shown in FIG. 7, it may be replaced with the phase adjusting unit 133 composed of an orifice portion.

Figure 8:
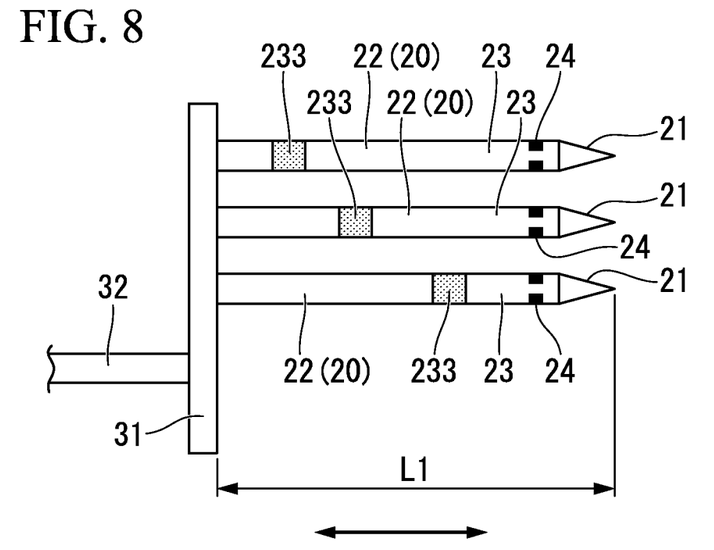
FIG. 8 is a schematic configuration diagram equivalent to FIG. 3 in a fourth embodiment of the present invention.

Next, the combustor 4 in a fourth embodiment of the present invention will be described based on a drawing. In addition, the combustor 4 of the fourth embodiment is different in only the configuration of the phase adjusting unit from the combustor 4 of the first embodiment described above. For this reason, description will be provided with the same portions denoted by the same reference numerals.

As shown in FIG. 8, the combustor 4 in this embodiment is provided with the plurality of main nozzles 20, similarly to the combustor 4 of the first embodiment described above. The plurality of main nozzles 20 are formed to extend parallel to the direction of the axis line O (shown by an arrow in FIG. 8). The lengths in the direction of the axis line O of the plurality of main nozzles 20 have the same length L1. The main nozzles 20 are arranged in the form of a ring centered on the axis line O to be spaced apart from each other in the circumferential direction. Each main nozzle 20 is provided with the tapered tip portion 21 which gradually reduces in diameter. The plurality of main injection holes 24 for injecting the main fuel are formed in the peripheral wall 23 of the nozzle main body portion 22 in the vicinity of the tip portion 21. The flow path cross-sectional area of each main nozzle 20 has a constant flow path cross-sectional area. The main nozzle 20 is provided with a phase adjusting unit 233 which partially changes the flow path cross-sectional area in the direction of the axis line O.

The phase adjusting unit 233 in this embodiment is made of a porous material such as foamed metal, which partially reduces the flow path cross-sectional area in the direction of the axis line O. Here, the phase adjusting unit 233 is disposed to be compressed into a flow path of the main nozzle 20. In the phase adjusting unit 233 made of a porous material, pores formed therein are connected to each other. The main fuel can pass through the inside of the pores. That is, the flow path cross-sectional area of the main nozzle 20 is reduced by the phase adjusting unit 233.

Similarly to the phase adjusting unit 33 of the first embodiment described above, in the main nozzle 20 which is provided with the phase adjusting unit 233, the acoustic characteristic thereof changes with respect to a main nozzle 20 which is not provided with the phase adjusting unit 233, whereby the phase of flow rate fluctuation is shifted. In a case where the shapes of the phase adjusting units 233 are the same, the acoustic characteristic of the main nozzle 20 changes according to the disposition of the phase adjusting units 233 in the direction of the axis line O. Here, as the shape of the phase adjusting unit 33, there is the proportion of the pores in the entirety of the phase adjusting unit 233, a length in the direction of the axis line O, or the like. For this reason, by changing the disposition in the direction of the axis line O of the phase adjusting units 233 in the main nozzles 20 adjacent to each other, it becomes possible to change the phases of flow rate fluctuation occurring in the main nozzles 20 adjacent to each other.

Further, the phase adjusting units 233 are disposed to be shifted away from each other in the direction of the axis line O such that the phases of flow rate fluctuation in the main nozzles 20 adjacent to each other have opposite phases.

Further, the main nozzle 20 has the main injection hole 24 having a size corresponding to pressure loss which increases due to the phase adjusting unit 233, similarly to the main injection hole 24 of the second embodiment. In this way, an increase in pressure loss in the entirety of the main nozzle 20 due to provision of the phase adjusting unit 233 does not occur.

Therefore, according to the combustor 4 of the fourth embodiment described above, the phase adjusting unit 233 made of a porous material is provided in the main nozzle 20, whereby it is possible to increase acoustic impedance in the main nozzle 20. For this reason, similarly to each of the embodiments described above, it is possible to reduce the amplitude of the fuel/air ratio in the combustion chamber by shifting the phases of flow rate fluctuation from each other between the main nozzles 20 adjacent to each other. Further, since the acoustic impedance is increased, the amplitude of flow rate fluctuation itself in the main nozzle 20 can be reduced.

The present invention is not limited to the configuration of each of the embodiments described above, and changes in design are possible within a scope which does not depart from the gist of the present invention.

For example, in the combustor 4 of the first embodiment described above, the size of the main injection hole 24 may be adjusted by an amount corresponding to a change in pressure loss due to provision of the phase adjusting unit 33.

Further, in the combustor 4 of the second embodiment, a case where the size of the main injection hole 24 is adjusted based on pressure loss in the phase adjusting unit 133 composed of the orifice portion has been described. However, the pressure used to supply fuel may be increased without adjusting the size of the main injection hole 24.

Further, in adjacent main nozzles 20 of each of the embodiments described above, the phases of fuel fluctuation are shifted from each other by shifting the disposition of the phase adjusting units 33, 133, or 233 in the direction of the axis line O. However, there is no limitation thereto. For example, the phases of flow rate fluctuation in the main nozzles 20 adjacent to each other may be shifted away from each other by changing the lengths in the direction of the axis line O of the cavity portion, the orifice portion, and the porous material, the sizes in the radial direction in the cavity portion and the orifice portion, the proportion of the pores in the porous material, or the like.

Further, in each of the embodiments described above, a configuration is made such that the phases of flow rate fluctuation in the main nozzles 20 adjacent to each other become opposite phases. However, there is no limitation thereto. If the phase of flow rate fluctuation in each main nozzle 20 is shifted even a little, as compared to a case where the phases match each other, the effect of reducing the amplitude of fluctuation of the fuel/air ratio in the combustion chamber is obtained.

Further in the first embodiment, a case where the phase adjusting units 33 are provided in all of the plurality of main nozzles 20 arranged has been described. In the third embodiment, a case where the phase adjusting units 33 are provided every other main nozzle has been described. However, it is enough if a configuration is made such that the phase adjusting unit 33 is provided in at least one main nozzle 20 among the plurality of main nozzles 20 and thus the phases of flow rate fluctuation occurring in at least two main nozzles 20 are shifted from each other. In this case, the effect of reducing the amplitude of fluctuation of the fuel/air ratio in the combustion chamber by an amount corresponding to a difference between the phases of flow rate fluctuation occurring in at least two main nozzles 20 is obtained.

Further, in the combustor 4 of the third embodiment described above, a case where the respective phase adjusting units 33 provided in the plurality of main nozzles 20 are disposed at the same positions in the direction of the axis line O has been described. However, it is sufficient if there is a disposition in which the phases of flow rate fluctuation in the main nozzles 20 adjacent to each other become opposite phases or are simply shifted from each other, and the positions in the direction of the axis line O may be different from each other.

Further, a case where the phases of flow rate fluctuation of the main fuel are shifted from each other between the main nozzles 20 has been described as an example. However, in a case where the phases of flow rate fluctuation in the pilot nozzle 15 and the main nozzle 20 match each other, or the like, the phase adjusting unit 33 (133 or 233) may be provided in at least one of the pilot nozzle 15 and the main nozzle 20. In this way, it is possible to shift the phases of flow rate fluctuation in the pilot nozzle 15 and the main nozzle 20.

Figure 9:
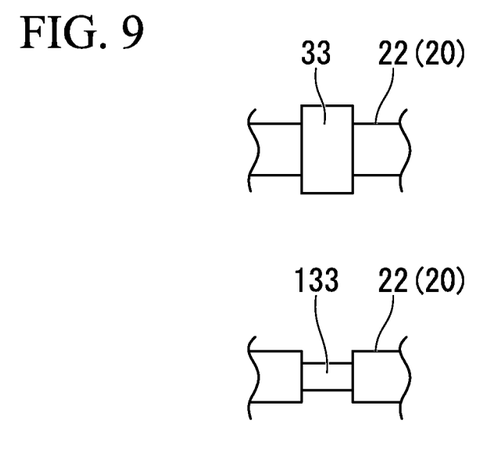
FIG. 9 is a partially enlarged view of the respective phase adjusting units provided in adjacent main nozzles in a modified example of each of the above embodiments.

Further, a case where the phase of flow rate fluctuation in the main nozzle 20 is changed according to the presence or absence of the phase adjusting unit 33 (133 or 233) and the disposition of the phase adjusting unit 33 (133 or 233) in the direction of the axis line O has been described. However, there is no limitation thereto. The respective acoustic characteristics when the phase adjusting unit 33 composed of the cavity portion, the phase adjusting unit 133 composed of the orifice portion, and the phase adjusting unit 233 made of the porous material are mounted on the main nozzle 20 are different from each other. For this reason, a configuration may be made so as to shift the phase of flow rate fluctuation by changing the type of phase adjusting unit. For example, as shown in FIG. 9, it is possible to shift the phase of flow rate fluctuation by providing the phase adjusting unit 33 composed of the cavity portion in the main nozzle 20 on one side of the main nozzles 20 adjacent to each other and providing the phase adjusting unit 133 composed of the orifice portion in the main nozzle 20 on the other side. Further, different types of phase adjusting units 33, 133, and 233 may be disposed to be shifted in the direction of the axis line O or disposed every other main nozzle in the array direction of the main nozzles 20.

INDUSTRIAL APPLICABILITY

The present invention relates to a combustor provided with a plurality of fuel nozzles which extend in an axial direction of a combustor main body and can inject fuel from injection holes which are disposed on the combustion chamber side, and a gas turbine which is provided with the combustor. According to the combustor and the gas turbine according to the present invention, it is possible to reduce combustion oscillation in the combustor, and therefore, it is possible to prevent damage to components due to combustion oscillation.

REFERENCE SIGNS LIST

1: gas turbine
2: air intake
3: compressor
4: combustor
5: turbine
10: combustor basket
11: combustor casing
12: combustor basket main body portion
13: combustor basket support
14: rear wall
15: pilot nozzle (fuel nozzle)
16: injection port
17: pilot cone
20: main nozzle (fuel nozzle)
21: tip portion
22: nozzle main body portion
23: peripheral wall
24: main injection hole
26: main burner
27: main swirler
28: air flow path
29: flow straightening plate
31: manifold
32: fuel pipe
33: phase adjusting unit
133: phase adjusting unit
233: phase adjusting unit
O: axis line
P: axis line

The invention claimed is:

1. A combustor comprising:
a plurality of main fuel nozzles extending in an axial direction of a combustor main body, each of the plurality of main fuel nozzles having a plurality of injection holes and being capable of injecting fuel from the plurality of injection holes therein on a combustion chamber side,
a plurality of phase adjusting units, each configured to partially change a flow path cross-sectional area of a respective one of at least two adjacent main fuel nozzles of the plurality of main fuel nozzles such that phases of flow rate fluctuation of the fuel in the at least two adjacent main fuel nozzles do not match, and
a manifold,
wherein the plurality of main fuel nozzles branch from and are connected to the manifold,
wherein each of the plurality of phase adjusting units is shifted away from an adjacent phase adjusting unit of the plurality of phase adjusting units in the axial direction,
wherein the plurality of main fuel nozzles are annularly spaced apart from each other in a circumferential direction,
wherein the plurality of phase adjusting units are between the manifold and the pluralities of injection holes of the at least two adjacent main fuel nozzles of the plurality of fuel nozzles,
wherein the respective plurality of injection holes of each of the at least two adjacent main fuel nozzles are larger than the respective plurality of injection holes of the remaining main fuel nozzles of the plurality of main fuel nozzles, and
wherein each respective plurality of injection holes of each of the at least two adjacent main fuel nozzles is increased in size corresponding to a respective increase in magnitude of pressure loss occurring across each respective phase adjusting unit.

2. A combustor comprising:
a plurality of main fuel nozzles extending in an axial direction of a combustor main body, each of the plurality of main fuel nozzles having a plurality of injection holes and being capable of injecting fuel from the plurality of injection holes therein on a combustion chamber side, a plurality of phase adjusting units, each configured to partially change a flow path cross-sectional area of a respective one of at least two adjacent main fuel nozzles of the plurality of main fuel nozzles such that phases of flow rate fluctuation of the fuel in the at least two adjacent main fuel nozzles do not match, and a casing, wherein each of the plurality of phase adjusting units is shifted away from an adjacent phase adjusting unit of the plurality of phase adjusting units in the axial direction, wherein the plurality of main fuel nozzles are annularly spaced apart from each other in a circumferential direction, wherein the number of phase adjusting units of the plurality of phase adjusting units is equal to the number of main fuel nozzles of the plurality of main fuel nozzles such that each of the plurality of main fuel nozzles corresponds to one of the plurality of phase adjusting units, wherein the casing has a rear wall, wherein the plurality of phase adjusting units are between the rear wall of the casing and the pluralities of injection holes, wherein the respective plurality of injection holes of at least one of the plurality of main fuel nozzles is larger than the respective plurality of injection holes of an adjacent one of the plurality of main fuel nozzles, and wherein each respective plurality of injection holes of each of the plurality of main fuel nozzles is increased in size corresponding to a respective increase in magnitude of pressure loss occurring across each respective phase adjusting unit.

3. The combustor according to claim 1, wherein: the plurality of main fuel nozzles are in a row, and every other main fuel nozzle of the plurality of main fuel nozzles corresponds to one of the plurality of phase adjusting units in an array direction in the plurality of main fuel nozzles.

4. The combustor according to claim 1, wherein: for each of the plurality of main fuel nozzles having a respective one of the plurality of phase adjusting units, a flow path cross-sectional area from the respective one of the plurality of phase adjusting units to the respective plurality of injection holes in the axial direction is constant, and the flow path cross-sectional areas of the plurality of main fuel nozzles between the respective plurality of phase adjusting units and the respective pluralities of injection holes in the axial direction are identical.

5. The combustor according to claim 1, wherein the plurality of phase adjusting units are configured to make the phases of flow rate fluctuation of the fuel in the at least two adjacent main fuel nozzles have opposite phases.

6. The combustor according to claim 1, wherein each of the plurality of phase adjusting units has a cavity portion configured to increase a flow path cross-sectional area of a respective one of the plurality of main fuel nozzles.

7. The combustor according to claim 1, wherein each of the plurality of phase adjusting units has an orifice portion configured to reduce a flow path cross-sectional area of a respective one of the plurality of main fuel nozzles.

8. The combustor according to claim 1, wherein each of the plurality of phase adjusting units is made of a porous material including pores in a flow path of a respective one of the plurality of main fuel nozzles.

9. A gas turbine comprising the combustor according to claim 1.

10. The combustor according to claim 1, wherein the plurality of phase adjusting units are not valves.

11. The combustor according to claim 2, wherein: the plurality of main fuel nozzles are in a row, and every other main fuel nozzle of the plurality of main fuel nozzles corresponds to one of the plurality of phase adjusting units in an array direction in the plurality of main fuel nozzles.

12. The combustor according to claim 2, wherein: for each of the plurality of main fuel nozzles having a respective one of the plurality of phase adjusting units, a flow path cross-sectional area from the respective one of the plurality of phase adjusting units to the respective plurality of injection holes in the axial direction is constant, and the flow path cross-sectional areas of the plurality of main fuel nozzles between the respective plurality of phase adjusting units and the respective pluralities of injection holes in the axial direction are identical.

13. The combustor according to claim 2, wherein the plurality of phase adjusting units are configured to make the phases of flow rate fluctuation of the fuel in the at least two adjacent main fuel nozzles have opposite phases.

14. The combustor according to claim 2, wherein each of the plurality of phase adjusting units has a cavity portion configured to increase a flow path cross-sectional area of a respective one of the plurality of main fuel nozzles.

15. The combustor according to claim 2, wherein each of the plurality of phase adjusting units has an orifice portion configured to reduce a flow path cross-sectional area of a respective one of the plurality of main fuel nozzles.

16. The combustor according to claim 2, wherein each of the plurality of phase adjusting units is made of a porous material including pores in a flow path of a respective one of the plurality of main fuel nozzles.

17. A gas turbine comprising the combustor according to claim 2.

18. The combustor according to claim 2, wherein the plurality of phase adjusting units are not valves.

* * * * *